UNITED STATES PATENT OFFICE.

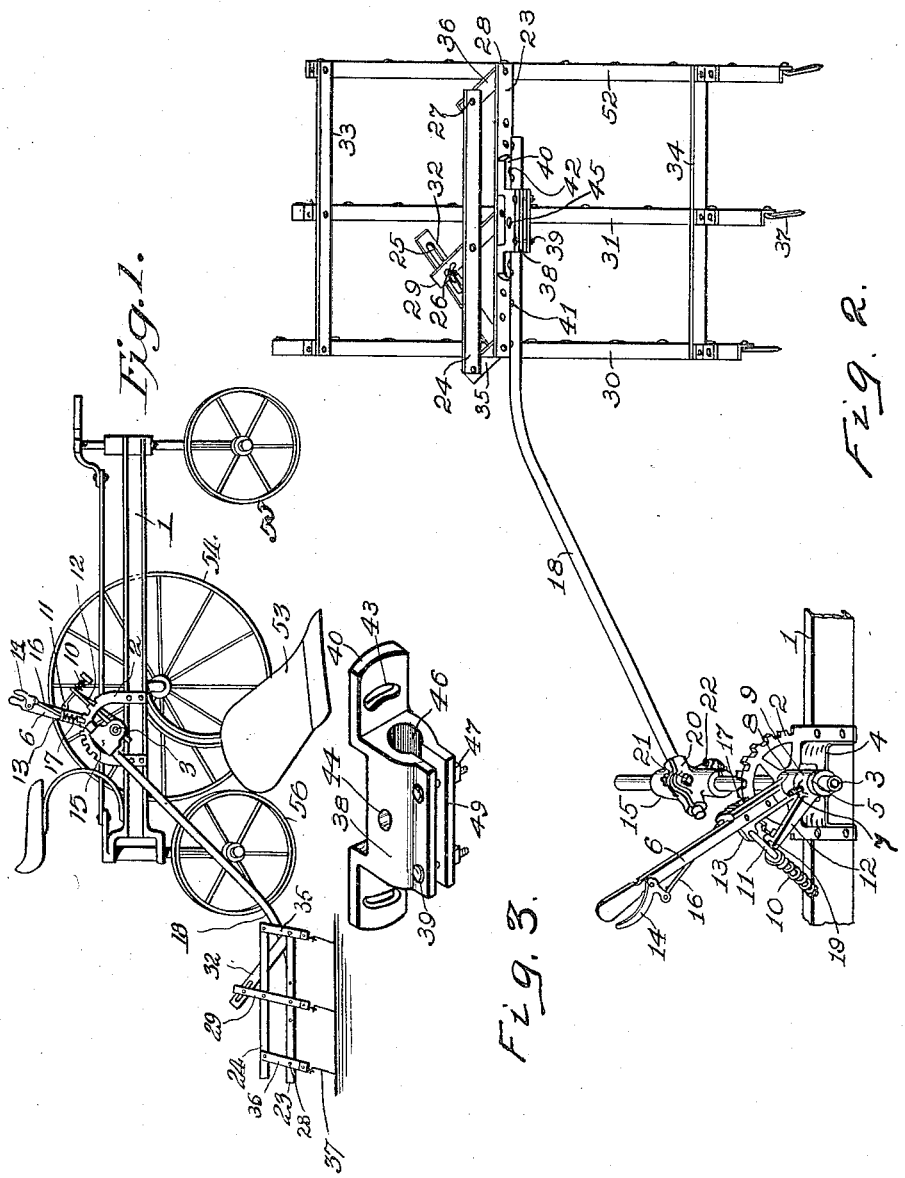

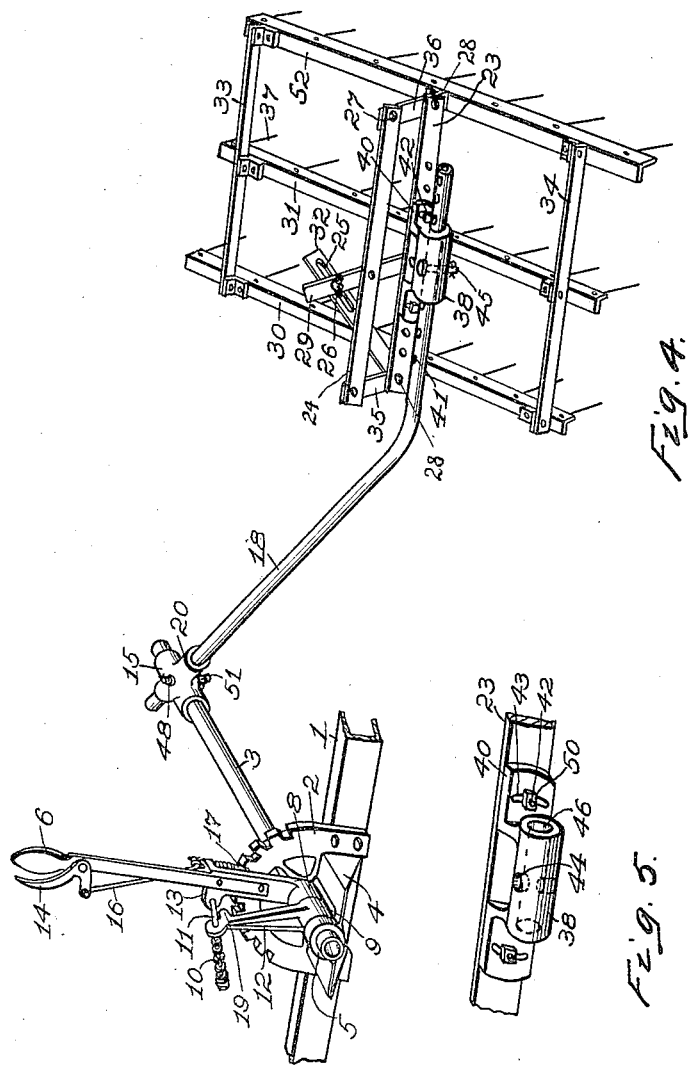

DANIEL H. YOUNG, OF MANCHESTER, IOWA, ASSIGNOR OF ONE-HALF TO JOSEPH B. EVERS, OF HOPKINTON, IOWA, AND ONE-HALF TO MARY BELLE YOUNG, OF MANCHESTER, IOWA.

CULTIVATOR.

1,122,837.  Specification of Letters Patent.  Patented Dec. 29, 1914.

Application filed May 6, 1913. Serial No. 765,813.

*To all whom it may concern:*

Be it known that I, DANIEL H. YOUNG, a citizen of the United States of America, and a resident of Manchester, Delaware county, Iowa, have invented certain new and useful Improvements in Cultivators, of which the following is a specification.

My invention relates to improvements in cultivators, especially to adjustable drag-connections therefor, and the object of my improvement is to adjustably and detachably connect a harrow or similar implement to the frame of a cultivator or a riding-plow in such a manner and by such movable means as to permit of variously adjusting the position of the implement drawn, to most appropriately support it while permitting it to assume the suitable inclinations desired, relative both to its location with respect to the traction-means and its working position on or in the soil. This object I have accomplished by the mechanism which is hereinafter described and claimed, and which is illustrated in the accompanying drawings, in which:

Figure 1 is a side elevation of a wheeled plow to which a harrow is connected by means of my improved adjustable connections. Fig. 2 is an enlarged perspective detail view of the harrow, and its said adjustable connections to a part of the frame of the traction-means. Fig. 3 is a perspective detail view of the split-sleeve connection for the rear end of the harrow draw-bar. Fig. 4 is a similar view to that of Fig. 2, but including some variations in the mechanical details of the adjustable connections. Fig. 5 is a perspective detail view of the type of the sleeve-connection for the draw-bar, as shown in Fig. 4.

Similar numerals of reference denote corresponding parts throughout the several views.

Referring first to Figs. 1 to 3 inclusive, the numeral 1 denotes the frame of a riding-plow adapted to support a plow 53 and mounted on the carrying-wheels 54, 55 and 56. A rack-segment 2 is secured upon the frame 1, and a bracket 4 having a bearing-sleeve 5 is also secured upon the frame to support the inner end of a transversely-extending bar or tube 3, rotatably. Upon said tube 3 is fixedly mounted a sleeve 9 having an integral projecting arm 12, which has at its outer end an orifice through which passes a short rod 11, one end of the latter being headed, with a coiled spring 10 seated thereabout between said head and said arm. The other end of the rod 11 is hooked to engage an orifice in a lug 13 on a hand-lever 6, the latter extending fixedly from a hub 8 mounted rotatably on the tube 3. The arm 12 has an integral lug 19, which extends into the path of movement of the lever 6 in one direction to form a stop therefor. The hand-lever 6 has the usual pivoted finger-piece 14, with resiliently-actuated connecting-rod 16 and detent 17, the latter detachably engaging the teeth of the rack-segment 2.

Upon the outer end of the tube 3 a sleeve-coupling 15 is adjustably mounted and secured thereon by a set-screw 51. This sleeve has an integral sleeve 20 thereon set at an angle therewith and adapted to receive the forward end of a draw-bar 18, the latter formed of a piece of tube, while both sleeves are split and set-screws 21 and 22 secure the bars 3 and 18 adjustably therein. The draw-bar 18 is normally inclined downwardly and rearwardly, and is bent to have its rearmost portion lie approximately parallel to and spaced from the ground. Upon this horizontal part a cylindrical sleeve-casting 38 is adjustably mounted for longitudinal adjustment, and has a pin-hole 44 adapted to be placed in registration with any one of a plurality of pin-holes 41 along said bar 18, with a pin 45 removably inserted therein to secure said parts together. The sleeve-casting is split longitudinally and along the split parts has the outwardly projecting parallel spaced flanges 49 provided with alined orifices adapted to receive bolts 39 having securing nuts 47, whereby the flanges may be drawn together to cause the sleeve to securely hold the draw-bar. The sleeve 38 has integral oppositely-projecting lugs 40, spaced apart, but lying in the same plane and each having an arc-shaped slot 43 adapted to adjustably register with a bolt-hole in the medial cross-bar 23 of the harrow, so that a bolt 42 may be passed therethrough and secured with a nut 50, to permit of a vertically-rocking adjustment of the sleeve relative to said cross-bar.

The three parallel cross-bars 33, 23 and 34 have pivotal connections to the three longitudinal tooth-carrying bars 30, 31 and 52 of the harrow. The said bars 30, 31 and 52 have fixed depending harrow-teeth 37. To vary the degree of inclination of said teeth, the said bars are rocked by the following described means.

The numeral 24 denotes a cross-bar located above and parallel to the medial cross-bar 23, and spaced therefrom. The bar 24 is supported movably above the bar 23 by pivotal connections with the upper ends of the short uprights 35, 29 and 36, the lower ends of which are pivotally connected to the ends of the bar 23 on pivot-bolts 28. Said uprights, however, have their lower ends fixed to the three longitudinal bars 30, 31 and 52. A bar 32, having a slot 25, is pivoted at its lower end to the bar 23. The middle upright 29 has its upper end projected above the bar 24, and has a bolt-hole, a bolt 26 being passed through said bolt-hole and the slot 25 in the bar 32, with a wing-nut thereon to secure said parts adjustably together, whereby the upright 29 may be rocked to vary the degree of inclination of the bars 30, 31, 52 with their harrow-teeth, and secured in their adjusted positions.

It will be perceived that I have provided several means of adjustment, whereby the harrow may be shifted transversely relative to the frame of the traction-device, or may be brought forward or back relative thereto, or tilted transversely or longitudinally relative to said draw-bar so as to adapt it to move easily and effectively over any kind of ground. The parts are sufficiently elastically mounted, moreover, with enough play permitted in the joints, so that breakage due to impacts with obstacles is nearly obviated.

The hand-lever 6 is used to rock the tube 3 to a desired degree, and the resilient connection 10 permits of some play to said tube, the draw-bar and the harrow in moving through irregular ground, to prevent damage.

In Figs. 4 and 5 are shown a few slight variations, not departures in principle from my invention: The connected sleeves 15—20 are not split, but are respectively secured detachably to the bars 3 and 18 by means of the set-screws 51 and 48. The sleeve-bearing 38 is also not split, and its bore 46 receives the draw-bar 18 adjustably like the other form of sleeve.

It will be noticed, referring to Figs. 2 and 4, that the draw-bar 18 is inclined outwardly in Fig. 2 and connected to the short shaft 3 at a relatively small distance from the frame 1, to do away with the need for a longer shaft 3, such as that shown in Fig. 4, when desired. It should also be noted that in my improved device, the harrow is so connected with the traction-device, that the teeth when inclined for the purpose of clearing rubbish, incline in planes parallel with the line of movement of the traction-device, and are not inclined to either side.

Having described my invention, what I claim as new, and desire to secure by Letters-Patent, is:

1. The combination with the frame of a preceding transportable implement, of a harrow, a draw-bar connected thereto for adjustment therealong and for vertical rocking adjustment of the harrow relative to the draw-bar, a rack-segment mounted on said implement-frame, a transverse rock-shaft mounted in said frame at the axis of said rack-segment, a hand-lever mounted to rock on said shaft and having a movable detent adapted to detachably engage the teeth on said rack-segment, an arm fixed to said shaft and orificed at its outer end, a headed hook-bar passed through the orifice of said arm with its hooked end pivotally connected to said hand-lever, a compression-spring seated between and engaging the said arm and the head of said hook-bolt, said arm having an integral lug projected into the path of movement of said hand-lever to limit its play in one direction, and an adjustable connection between said rock-shaft and draw-bar adapted to permit of both longitudinal and transverse adjustments of the draw-bar on the rock-shaft.

2. The combination with the frame of a transportable implement, of a harrow, a draw-bar connected to said transportable implement for vertical rocking-adjustment relative thereto, and a split-sleeve connected to said harrow for rocking-adjustment of the harrow relative thereto, the split-sleeve having spaced flanges, means for adjustably securing said flanges together to hold one end of the draw-bar therein, the sleeve having an orifice and the draw-bar a plurality of alined orifices adapted to be adjustably placed in registration, and fastening-means seated removably in the said registering orifices.

3. The combination with a traction-device of a harrow and a draft-connection between them, said harrow having a bar secured across it having a plurality of alined orifices, a bearing-body having orifices adapted to be placed in registration with certain of the orifices in said bar adjustably, detachable fastening-means in said registering orifices adapted to secure said parts together, the said draft connection being detachably secured in said bearing-body.

Signed at Waterloo, Iowa, this 18th day of April 1913.

DANIEL H. YOUNG.

Witnesses:
G. C. KENNEDY,
W. H. BRUNN.